(12) United States Patent
Du et al.

(10) Patent No.: US 11,982,005 B2
(45) Date of Patent: May 14, 2024

(54) STRUCTURALLY MODIFIED NANOSHEETS OF METAL OXIDES AND RELATED METHODS

(71) Applicant: Northwestern University, Evanston, IL (US)

(72) Inventors: Jingshan Du, Evanston, IL (US); Qian Rong, Kunming (CN); Vinayak P. Dravid, Glenview, IL (US)

(73) Assignee: Northwestern University, Evanston, IL (US)

(*) Notice: Subject to any disclaimer, the term of this patent is extended or adjusted under 35 U.S.C. 154(b) by 647 days.

(21) Appl. No.: 17/155,180

(22) Filed: Jan. 22, 2021

(65) Prior Publication Data
US 2021/0230753 A1 Jul. 29, 2021

Related U.S. Application Data

(60) Provisional application No. 62/965,218, filed on Jan. 24, 2020.

(51) Int. Cl.
*C23C 18/12* (2006.01)
*C01G 53/00* (2006.01)
(Continued)

(52) U.S. Cl.
CPC .............. *C25B 1/04* (2013.01); *C01G 53/04* (2013.01); *C01G 53/40* (2013.01);
(Continued)

(58) Field of Classification Search
CPC ............ C23C 18/1216; C23C 18/1225; C23C 18/1266; C01P 2002/50; C01P 2002/72;
(Continued)

(56) References Cited

U.S. PATENT DOCUMENTS

2021/0404073 A1* 12/2021 Kanatzidis .............. C25B 11/02

OTHER PUBLICATIONS

Xiang et al., In Situ Vertical Growth of Fe—Ni LayeredDouble-Hydroxide Arrays on Fe—Ni Alloy Foil: Interfacial Layer Enhanced Electrocatalystwith Small Overpotential for OxygenEvolution Reaction, Sep. 10, 2018, ACS Piblication, DOI:10.1021/acsenergylett. 8b01466ACSEnergyLett.2018, 3, 2357-2365. (Year: 2018).*

(Continued)

*Primary Examiner* — Hai Y Zhang
(74) *Attorney, Agent, or Firm* — Bell & Manning, LLC

(57) ABSTRACT

Electrocatalytic materials and methods of making the electrocatalytic materials are provided. Such a method may comprise forming precursor nanosheets comprising a precursor metal on a surface of a substrate; exposing the precursor nanosheets to a modifier solution comprising a polar, aprotic solvent and a metal salt at a temperature and for a period of time, the metal salt comprising a metal cation and an anion, thereby forming modified precursor nanosheets; and calcining the modified precursor nanosheets for a period of time to form an electrocatalytic material comprising structurally modified nanosheets and the substrate, each nanosheet extending from the surface of the substrate and having a solid matrix. The solid matrix defines pores distributed throughout the solid matrix and comprises a precursor metal oxide and domains of another metal oxide distributed throughout the precursor metal oxide; or the solid matrix comprises the precursor metal oxide and nanoparticles of the another metal oxide distributed on a surface of the solid matrix.

16 Claims, 16 Drawing Sheets

(51) Int. Cl.
*C01G 53/04* (2006.01)
*C25B 1/04* (2021.01)

(52) U.S. Cl.
CPC ...... *C23C 18/1216* (2013.01); *C23C 18/1225* (2013.01); *C23C 18/1266* (2013.01); *C01P 2002/50* (2013.01); *C01P 2002/72* (2013.01); *C01P 2002/85* (2013.01); *C01P 2004/04* (2013.01); *C01P 2004/24* (2013.01); *C01P 2006/40* (2013.01)

(58) Field of Classification Search
CPC .............. C01P 2002/85; C01P 2004/04; C01P 2004/24
See application file for complete search history.

(56) References Cited

OTHER PUBLICATIONS

Qian Xiang et al., "In situ Vertical Growth of Fe—Ni Layered Double-Hydroxide Arrays on Fe—Ni Alloy Foil: Interfacial Layer Enhanced Electrocatalyst with Small Overpotential for Oxygen Evolution Reaction," *ACS Energy Lett.* 2018, vol. 3, pp. 2357-2365.
Nilesh G. Saykar et al., "Synthesis of NiO—Co3O4 nanosheet and its temperature-dependent supercapacitive behavior" *J. Phys. D: Appl. Phys.*, vol. 51, (2018), 475501 (9pp).
Dongkai Jiang et al., "NiO/NixCo3—xO4 porous ultrathin nanosheet/nanowire composite structures as high-performance supercapacitor electrodes," *RSC Adv.*, 2018, vol. 8, p. 31853-31859.

\* cited by examiner

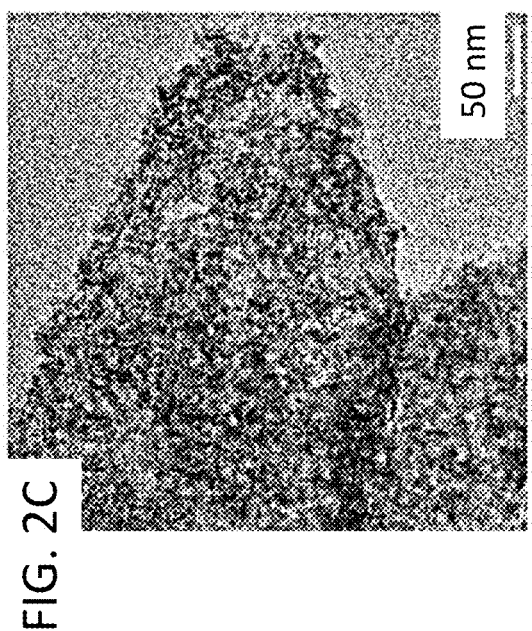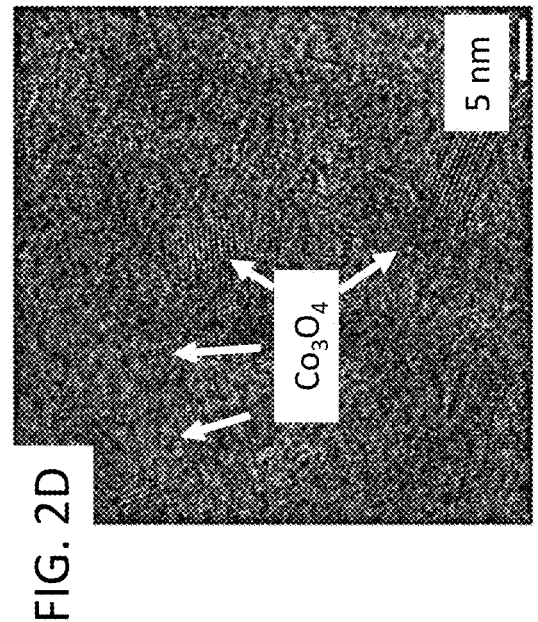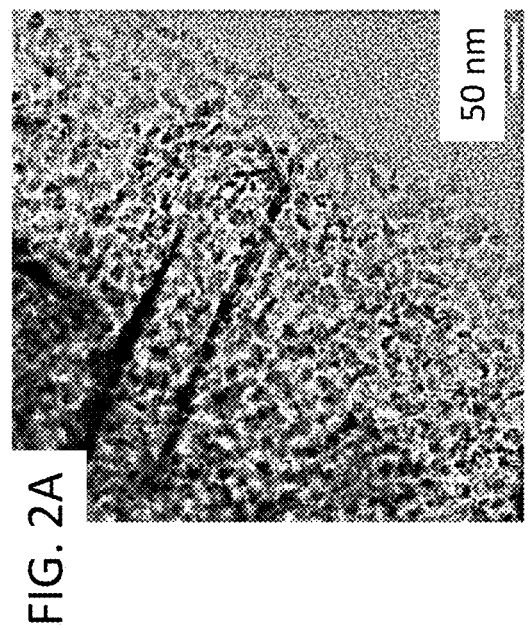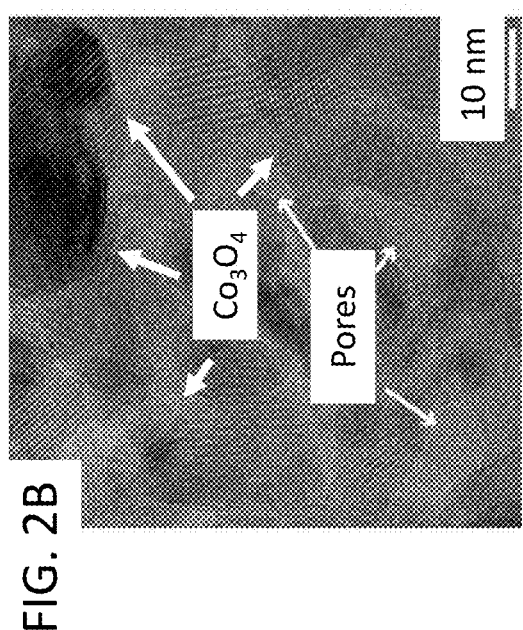

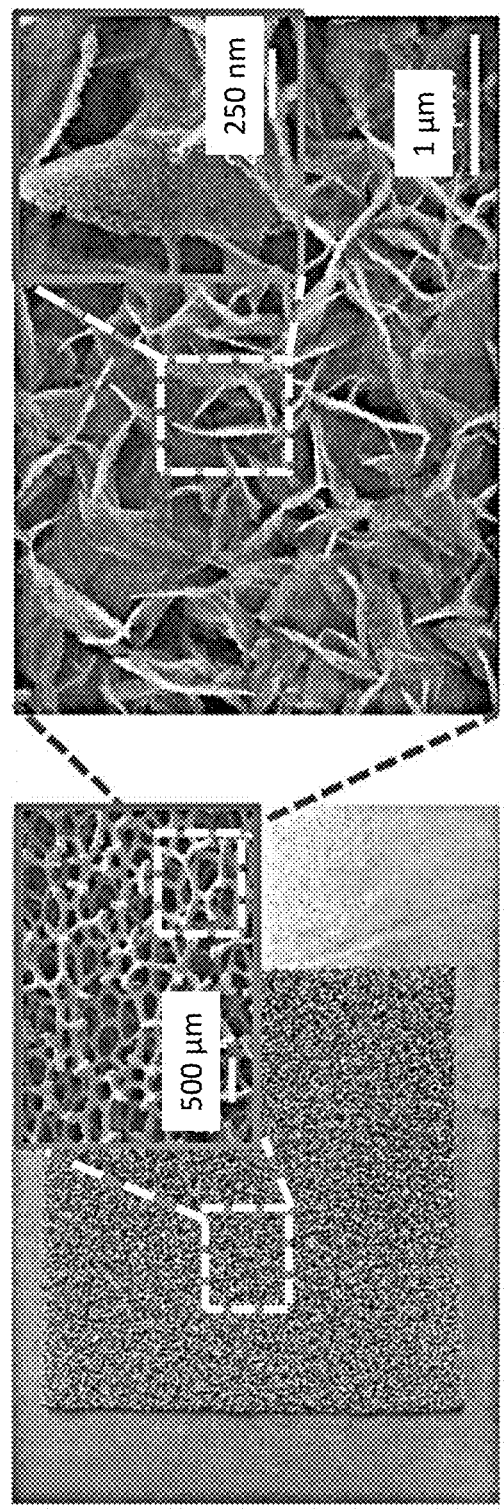

STRUCTURALLY MODIFIED NANOSHEETS OF METAL OXIDES AND RELATED METHODS

CROSS-REFERENCE TO RELATED APPLICATIONS

The present application claims priority to U.S. provisional patent application No. 62/965,218 that was filed Jan. 24, 2020, the entire contents of which are incorporated herein by reference.

BACKGROUND

Electrocatalytic water splitting is the central component in developing a hydrogen cycle for complementing and eventually having the potential to replace the non-renewable, fossil fuel-based carbon cycle. However, the intrinsically sluggish anode reaction, oxygen evolution reaction (OER), limits the overall water splitting efficiency because of its multistep electron transfer process. Currently, most efforts on enhancing the OER performance on electrode materials have focused on improving the surface adsorption properties, surface-to-volume ratio, and conductivity. In this case, noble metal oxides such as $RuO_2$ and $IrO_2$ have been commercialized due to their high OER activity, whereas the high cost and scarcity of these materials has hampered their widespread use. Other efforts have been directed to earth-abundant and low-cost oxide materials based on transition metals (e.g., Fe, Co, Ni, and Mn). Although elemental doping has been used to promote charge transfer and to optimize surface electronic structures, there is still substantial space for optimizing the OER performance of these materials due to the low utilization efficiency of active sites. Several types of Ni-based transition metal oxide nanostructures, including nanosheets, nanowires, and nanoflowers have been also been reported. It is worth noting that many of these materials still require a harsh operating condition in strongly alkaline electrolytes (pH=14).

SUMMARY

Provided are electrocatalytic materials and electrodes and electrocatalytic systems which include the materials. Also provided are methods for making and using the electrocatalytic materials. The electrocatalytic materials comprise structurally modified nanosheets composed of a metal oxide, including a multimetal oxide.

In embodiments, a method of making an electrocatalytic material comprises forming precursor nanosheets comprising a precursor metal on a surface of a substrate; exposing the precursor nanosheets to a modifier solution comprising a polar, aprotic solvent and a metal salt at a temperature and for a period of time, the metal salt comprising a metal cation and an anion, thereby forming modified precursor nanosheets; and calcining the modified precursor nanosheets for a period of time to form an electrocatalytic material comprising structurally modified nanosheets and the substrate, each nanosheet extending from the surface of the substrate and having a solid matrix. The solid matrix defines pores distributed throughout the solid matrix and comprises a precursor metal oxide and domains of another metal oxide distributed throughout the precursor metal oxide; or the solid matrix comprises the precursor metal oxide and nanoparticles of the another metal oxide distributed on a surface of the solid matrix.

In embodiments, an electrocatalytic material comprises structurally modified nanosheets and a substrate, each nanosheet extending from a surface of the substrate and having a solid matrix. The solid matrix defines pores distributed throughout the solid matrix and comprises a precursor metal oxide and domains of another metal oxide distributed throughout the precursor metal oxide; or the solid matrix comprises the precursor metal oxide and nanoparticles of the another metal oxide distributed on a surface of the solid matrix.

Electrocatalytic systems comprising the electrocatalytic material are also provided as well as methods of using the electrocatalytic systems.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1A) Schematic illustration of the preparation procedures for MNi—O NSs (M: Fe, Co and Mn) and secondary electron (SE) images of CoNi—O pNSs, NiO NSs, and CoNi—O bNSs grown on ITO. FIGS. 1B, 1C) SE images and EDS elemental maps for CoNi—O pNSs (FIG. 1B) and CoNi—O bNSs (FIG. 1C). FIG. 1D) XRD patterns. FIGS. 1E, 1F) XPS spectra and fitting results for Ni 2p (FIG. 1E) and Co 2p (FIG. 1F). Sat.: satellite peak. FIG. 1G) Quantification of atomic ratios from XPS results. FIGS. 1H-1J) $N_2$ adsorption-desorption isothermal curves (FIG. 1H), pore diameter distribution calculated from the Barrett-Joyner-Halenda (BJH) method (FIG. 1I), and the derived specific surface area (FIG. 1J).

FIGS. 2A-2I. Secondary nanostructures on NiO NSs through two types of modification mediated by chlorides or nitrates. FIGS. 2A-2B) CoNi—O pNSs modified by $CoCl_2$ in acetone. FIGS. 2C-2D) CoNi—O bNSs modified by $Co(NO_3)_2$ in acetone. Panel descriptions: FIGS. 2A, 2C) TEM images of individual nanosheets. FIGS. 2B, 2D) HRTEM images are filtered in the reciprocal space to highlight $Co_3O_4$ lattices based on two distinct crystal planes (111) and (022), colored, and then stacked with the original image. Representative $Co_3O_4$ domains and pore regions are highlighted by arrows. FIG. 2E) FeNi—O pNSs modified by $FeCl_3$ in acetone characterized by SE imaging (FIG. 2E) and EDS elemental mapping. FIGS. 2F-2H) MnNi—O bNSs modified by $Mn(NO_3)_2$ in acetone. Panels descriptions: FIG. 2F) SE image. FIG. 2G) TEM image of individual nanosheets. FIG. 2H) HRTEM images are filtered in the reciprocal space to highlight $Mn_3O_4$ lattices based on five distinct crystal planes, colored, and then stacked with the original image. Representative $Mn_3O_4$ domains are marked by arrows.

FIGS. 4A-4L. Oxygen evolution performance of hierarchical structured electrodes in 0.1 M KOH. FIGS. 4A-4C) OER polarization and metrics of bi-transition metal oxide nanosheets on ITO coated glass. FIGS. 4D-4F) OER polarization and metrics of multi-transition metal oxide nanosheets on ITO coated glass. Samples are compared to the same unmodified NiO NS sample in linear sweep voltammetry (FIG. 4A), overpotential (II) at 10 mA·cm$^{-2}$ (FIG. 4B), and Tafel polarization curves (FIG. 4C). FIG. 4G) Photo of a Ni foam. Inset: low-magnitude SE image showing the Ni foam after sample deposition. FIG. 4H) SE image of the hierarchical FeMnNi—O NSs on Ni foam. Inset: Enlarged SE image of an individual nanosheet. FIGS. 4I, 4J) Linear sweep voltammetry (FIG. 4I) and Tafel polarization curves (FIG. 4J) of the samples supported on Ni foam. FIG. 4K) Repeatability of the best-performing samples shown by the distribution of Tafel slope by samples synthesized from different batches. FIG. 4L) Long-term performing stability of FeMnNi—O NS on Ni foam shown by current density at a constant voltage (1.53 V vs. RHE) in 0.1 M KOH electrolyte, Inset: The current density of samples within the first 40 h of working time.

DETAILED DESCRIPTION

Figure 1A:
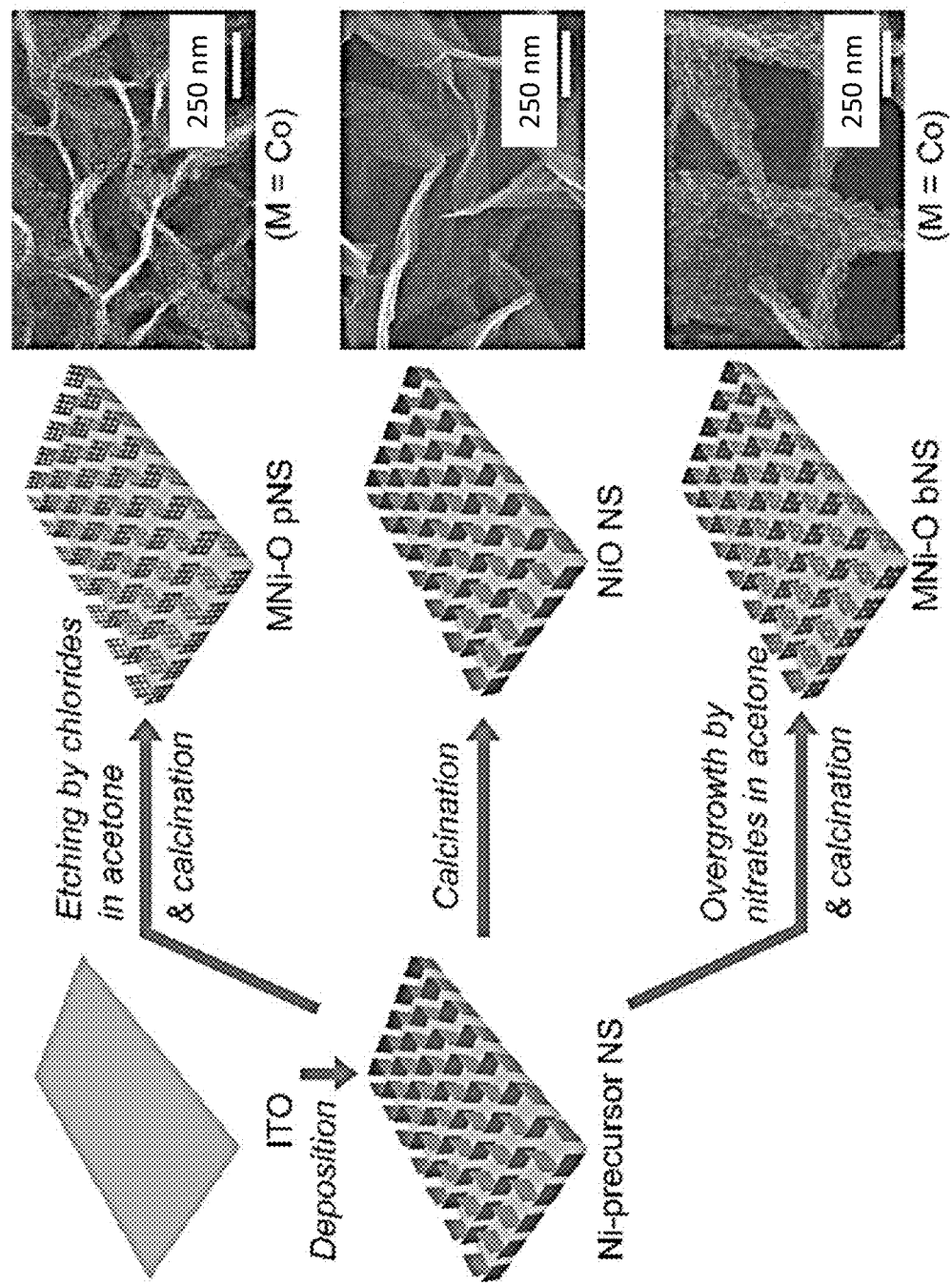
FIGS. 1A-1J. Porous and branched nanosheets (pNSs and bNSs) synthesized by bidirectional nanomodification with metal salts in acetone.

Provided are electrocatalytic materials and electrodes and electrocatalytic systems which include the materials. Also provided are methods for making and using the electrocatalytic materials. The electrocatalytic materials comprise structurally modified nanosheets composed of a metal oxide. There may be one type of metal oxide or multiple types of metal oxides (multimetal oxide). The electrocatalytic materials are heterogeneous and hierarchical both in terms of their physical structure and in embodiments, in terms of their chemical composition. This provides at least some embodiments of the materials with superior electrocatalytic properties, including the ability to efficiently catalyze the OER over extended periods of time.

In one aspect, electrocatalytic materials are provided. In an embodiment, such an electrocatalytic material comprises structurally modified nanosheets composed of a metal oxide, each nanosheet extending from a surface of a substrate and having a solid matrix and a structural feature in the form of pores distributed throughout the solid matrix or nanoparticles distributed on a surface of the solid matrix. The phrase "solid matrix" refers to the solid material of the nanosheet. Structurally modified nanosheets having pores distributed throughout may be referred to as porous nanosheets (or pNS). Structurally modified nanosheets having nanoparticles distributed thereon may be referred to branched nanosheets (or bNS). Unmodified nanosheets which become structurally modified according to certain of the methods described herein to form the structurally modified nanosheets may be referred to as precursor nanosheets.

The structurally modified nanosheets generally extend away from the surface of the substrate. That is, nanosheets define a plane, one side of which may be anchored to the substrate, the plane extending away from the surface of the substrate to an opposing side of the nanosheet. An angle may be defined between the plane of the nanosheet and a plane defined by the surface of a substrate. However, this angle is not particularly limited. Some nanosheets may extend perpendicularly away from the surface of the substrate (e.g., have an angle of about 90°), but others may have smaller angles and still others may extend along the surface of the substrate. The orientation of neighboring nanosheets may be random with respect to one another. That is, nanosheet planes of neighboring nanosheets may extend parallel to one another, perpendicularly to one another, or at some other angle. The distribution of the nanosheets on the surface of the substrate may be approximately uniform. The nanosheets may be densely packed on the surface of the substrate such that neighboring nanosheets may contact one another at their respective sides or ends. This results in the substrate surface having a wrinkled or sponge-like appearance. (See, e.g., FIGS. 1A, 1B, 1C, 2E, 2F.)

The structurally modified nanosheets are planar, two-dimensional nanostructures having a thickness which is quite small and lengths (measured parallel to the substrate) and heights (measured perpendicular to the substrate) which are significantly greater. The average thickness may be no greater than 50 nm, no greater than 20 nm, no greater than 10 nm, no greater than 5 nm or in the range of 2 nm to 50 nm. The lengths and heights may be of similar magnitude to one another, although the overall shape defined by these other two dimensions is not particularly limited. These other two dimensions may be on the order of from 200 nm to 600 nm.

The structurally modified nanosheets are composed of a metal oxide. This includes being composed of a single type of metal oxide (monometal oxide), but also includes being composed of more than one type of metal oxide (multimetal oxide). The number of metal oxides in a multimetal oxide may be two, three, four, or more. The metal may be a transition metal. Illustrative transition metals include Fe, Co, Ni, and Mn, but others may be used. By "oxide" it is meant oxides, hydroxides, and oxyhydroxides. The different types of metals present in multimetal oxides generally each form their own oxides, as opposed to a doped or alloyed metal oxide. By way of illustration, a structurally modified CoNi—O nanosheet according to the present disclosure refers to one composed of $Co_3O_4$ and NiO (as well as the corresponding (oxy)(hydro)oxides) as opposed to one composed of $Ni_xCo_{3-x}O_4$. The particular composition selected for the structurally modified nanosheet depends upon the electrochemical reaction to be catalyzed. Structurally modified nanosheets composed of multimetal oxides are heterogeneous and hierarchical in terms of their chemical composition in addition to their structural heterogeneity/hierarchy as described herein.

Regarding the chemical composition of the structurally modified metal oxide nanosheets, they may be characterized by formula $M_1M_nM_p$-O, wherein $M_1$ is a first transition metal, $M_n$ is an $n^{th}$ transition metal, $M_p$ is a precursor transition metal, and n is an integer of 0 or more. The "O" represents the (oxy)(hydro)oxide forms of each of the transition metals present. The term "precursor" reflects the use of precursor nanosheets in the methods used to form the structurally modified metal oxide nanosheets, as further described below. In embodiments, n is 0, 1, 2, or 4. $M_1$, $M_n$, and $M_p$ are generally different transition metals (providing structurally modified multimetal oxide nanosheets). However, in embodiments, the transition metals may be the same (providing structurally modified monometal oxide nanosheets). For example, in embodiments, the structurally modified metal oxide nanosheet is characterized by formula $M_1M_p$-O, wherein $M_1$ and $M_p$ are the same transition metal. In embodiments, the structurally modified metal oxide nanosheet is characterized by formula $M_1M_2M_p$-O, wherein $M_1$, $M_2$, and $M_p$ are different transition metals. In embodiments, the structurally modified metal oxide nanosheet is characterized by formula $M_1M_2M_3M_p$-O, wherein $M_1$, $M_2$, $M_3$, and $M_p$ are different transition metals.

Structurally modified nanosheets composed of a monometal oxide (NiNi—O) were synthesized and tested as described in the Example, below. Similarly, structurally modified nanosheets composed of multimetal oxides (MiNi—O, wherein $M_1$ is Co, Fe, Mn) were also synthesized and tested as described in the Example, below. HRTEM images of such structurally modified multimetal oxides are shown in FIGS. 2A-2H. Structurally modified nanosheets composed of other multimetal oxides having three and four different types of metal oxides were also synthesized and tested as described in the Example, below.

Regarding the morphology of the structurally modified metal oxide nanosheets, the planar, two-dimensional nature of the nanosheets provides the present electrocatalytic materials with a first structural feature. The second structural feature is a result of the modification afforded by certain of the methods disclosed herein. As noted above, that modification is either the creation of pores distributed throughout the solid matrix (to provide porous nanosheets) or the deposition of nanoparticles distributed on a surface of the solid matrix (to provide branched nanosheets).

Porous metal oxide nanosheets may be characterized as having a solid matrix comprising a precursor metal oxide and domains of another metal oxide (i.e., one or more metal oxides) integrated within and distributed throughout the precursor metal oxide. As noted above, the "another metal oxide" may be of the same type as the precursor metal oxide, but is generally a different type. The solid matrix defines pores which are distributed (generally uniformly) throughout the solid matrix. Pore cross-sections may be characterized as being circular, but this term encompasses elliptical and irregularly shaped pores that are reasonably approximated by a circle. The existence, distribution, and cross-sectional shape of the pores (as well as the domains) may be confirmed from HRTEM images. By way of illustration, FIG. 2B shows an HRTEM image of a CoNi—O porous nanosheet. The image shows that the solid matrix comprises $Co_3O_4$ domains integrated within and distributed throughout NiO. Pores are also distributed uniformly throughout the solid matrix. Although not shown, HRTEM images of FeMnNi—O porous nanosheets show $Fe_2O_3$ domains and $Mn_2O_3$ domains uniformly distributed throughout NiO and pores distributed uniformly throughout.

The size of the pores in porous metal oxide nanosheets may be determined using the Barrett-Joyner-Halenda (BJH) method. (See FIG. 1I.) The average diameter of the pores may be no more than 5 nm, no more than 10 nm, or in a range of from 2 nm to 10 nm. (It is noted that the BJH results for the branched metal oxide nanosheets in FIG. 1I result from compartments formed between neighboring nanoparticles (branches) as opposed to pores formed within the solid matrix.) The metal oxide domains may be characterized as being circular and having an average diameter of no more than 50 nm, no more than 20 nm, or in a range of from 10 nm to 50 nm. The outer surfaces of the solid matrix of porous metal oxide nanosheets are generally free of other structural features, i.e., nanostructures such as nanoparticles, nanowires, etc.

Figure 2E:
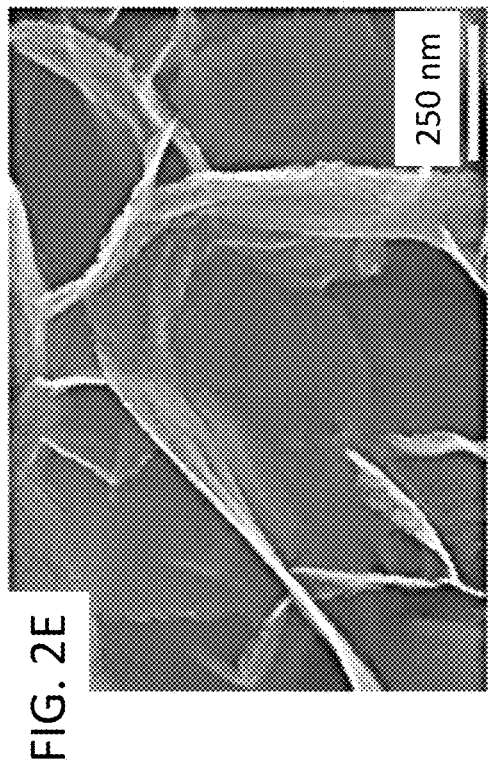
Figure 2F:
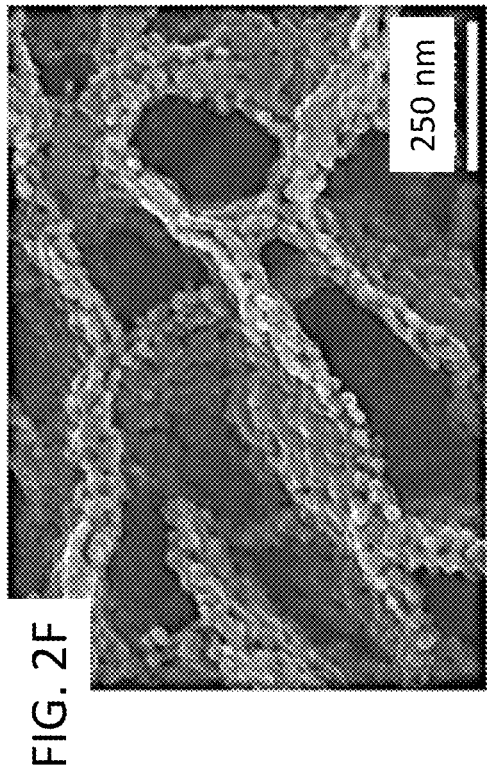
Figure 2G:
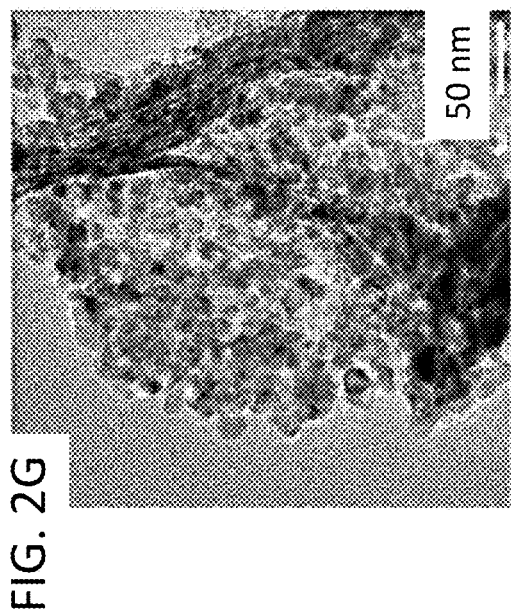
Figure 2H:
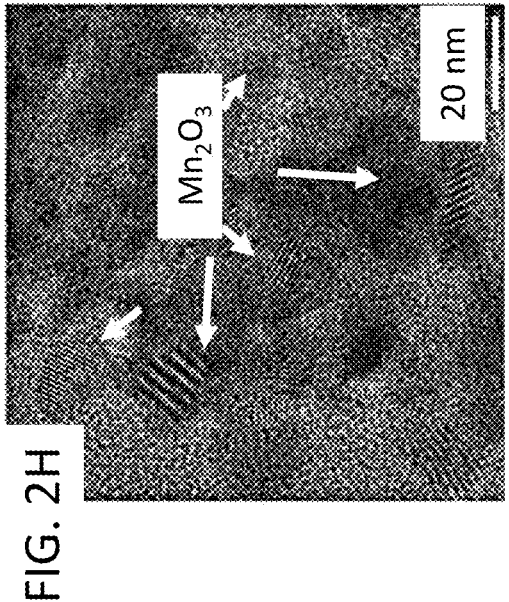

Branched metal oxide nanosheets may be characterized has having a solid matrix comprising a precursor metal oxide and nanoparticles of another metal oxide (i.e., one or more metal oxides) deposited thereon. Again, the "another metal oxide" may be of the same type as the precursor metal oxide, but is generally a different type. The distribution of the nanoparticles on the underlying precursor oxide is generally uniform. Although nanoparticles may be characterized as being spherical, this term encompasses elliptical and irregularly shaped nanoparticles that are reasonably approximated by a sphere. The existence, distribution, and shape of nanoparticles may be confirmed from HRTEM images. By way of illustration, FIG. 2D shows an HRTEM image of a CoNi—O branched nanosheet. The image shows that the solid matrix comprises $Co_3O_4$ nanoparticles uniformly distributed on an underlying NiO surface. Similarly, FIG. 2H is an HRTEM image of a MnNi—O branched nanosheet having a solid matrix comprising $Mn_2O_3$ nanoparticles uniformly distributed on an underlying NiO surface. Although not shown, HRTEM images of FeMnNi—O branched nanosheets show $Fe_2O_3$ nanoparticles and $Mn_2O_3$ nanoparticles uniformly distributed on an underlying NiO surface.

The size of the nanoparticles in branched metal oxide nanosheets may be determined from HRTEM images. The average diameter of the nanoparticles may be no more than 50 nm, no more than 20 nm, or in a range of from 10 nm to 50 nm. The outer surfaces of the solid matrix of branched metal oxide nanosheets are generally free of other structural features (except for the nanoparticles), i.e., free of nanostructures such as nanowires. Unlike porous metal oxide nanosheets, at least in embodiments, branched metal oxide nanosheets are not porous. However, in other embodiments, the solid matrix of branched metal oxide nanosheets may also define pores.

The unique morphology of the structurally modified metal oxide nanosheets is achieved, at least in part, due to the methods described below, involving the use of precursor nanosheets which are subsequently exposed to certain modifier solutions under certain conditions to induce the structural modifications such as pores, integration of domains, and/or deposition of nanoparticles. Existing methods differ from this approach and thus, are not capable of forming the present structurally modified metal oxide nanosheets. By way of illustration, the methods, and thus, the resulting structures, described in Jiang, D. et al, *RSC Adv.*, 2018, 8, 31853 and Saykar, N. G. et al 2018 *J. Phys. D: Appl. Phys.* 51 475501 are distinguished from the present structurally modified metal oxide nanosheets.

The present electrocatalytic materials may comprise the substrate from which the structurally modified nanosheets extend. The substrate is generally a conductive substrate, e.g., indium tin oxide (ITO). Although the substrate may be flat, a third structural feature may be provided in the electrocatalytic material by using substrates having other morphologies. For example, a foam, such as a metal foam, may be used as the substrate. Metal foams provide a three-dimensional, sponge-like, web-like network which defines another set of pores in the electrocatalytic material. These pores are also uniformly distributed but are generally much larger, e.g., in the range of from 1 μm to 1 mm. (See FIG. 4G showing a Ni foam.) The pores of a metal foam are interconnected such that in three-dimensions, the network of the metal foam defines elongated, tortuous channels distributed throughout the network.

Methods of making the present electrocatalytic materials are also provided. In embodiments, such a method comprises forming precursor nanosheets comprising a precursor metal (e.g., transition metal) on a surface of a substrate followed by exposing the precursor nanosheets to a modifier solution comprising a polar, aprotic solvent (e.g., acetone) and a metal salt (e.g., transition metal salt) at a temperature and for a period of time. The precursor nanosheets may comprise a single type of metal, e.g., $M_p$ in the formulas described above. This metal may be present in the form of its oxide, hydroxides, and/oxyhydroxides, although the crystallinity of these compounds are generally not well defined within the precursor nanosheets. The metal salt comprises a metal cation, e.g., $M_1 \ldots M_n$ in the formulas described above, and an anion. As noted above, this metal cation may be the same, but is generally different from the metal of the precursor nanosheets. The metal salt may be in its hydrated or anhydrous form. The hydrated form is useful for controlling the water content in the modifier solution, but this may also be achieved by controlling the environmental humidity or adding water into the modifier solution. The temperature and period of time are selected to induce the structural modification (creation of domains and pores/deposition of nanoparticles) described above. Next, the modified precursor nanosheets are calcined in air/$O_2$ for a period of time to provide the structurally modified nanosheets composed of a metal oxide. Illustrative temperatures and periods of time for both the exposure to the modifier solution and for calcination are provided in the Example, below. For example, the temperature may be in a range of from 20° C. to 70° C., from 25° C. to 65° C., or from 30° C. to 60° C. The time may be in a range of from 1 minute to 30 minutes, from 1 minute to 15 minutes, or from 1 minute to 10 minutes.

Figure 3:
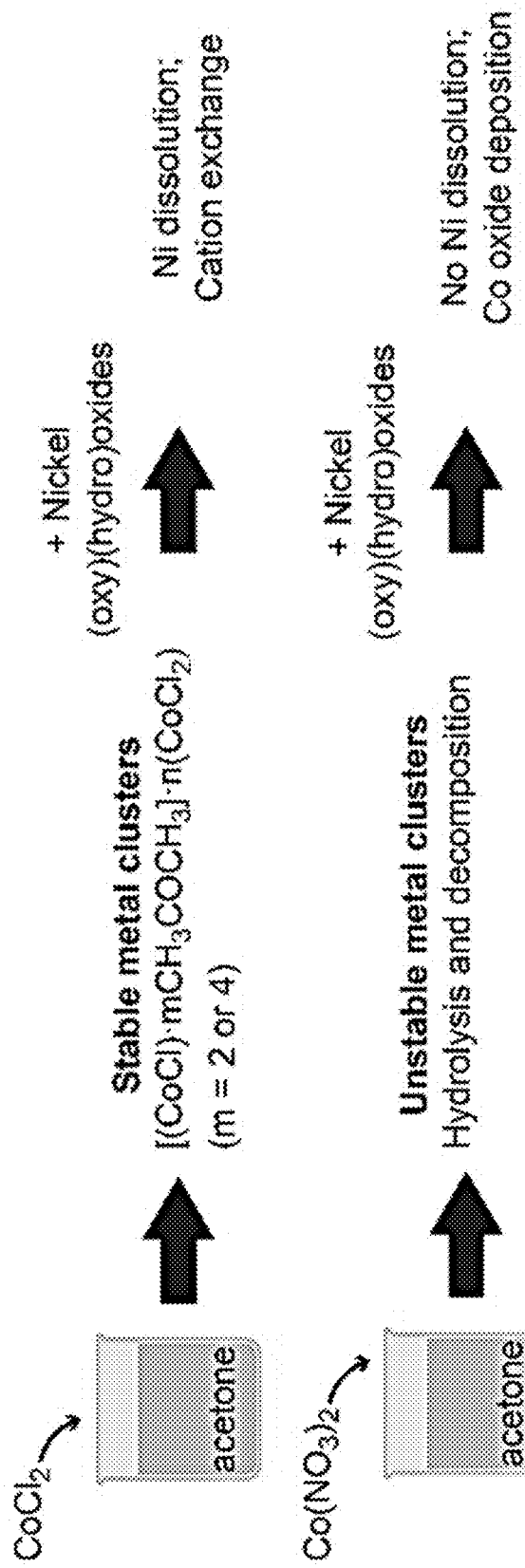
FIG. 3. Mechanistic pathways of the bidirectional nanomodification. $CoCl_2$ in acetone forms well defined metal clusters through monomer addition by [$CoCl_2$], while $Co(NO_3)_2$ in acetone does not form stable clusters. Proposed mechanism during the modification. With metal chlorides, stable metal clusters are formed in acetone, which facilitates Ni dissolution from the nanosheets into the solution, resulting in the porous structures. With metal nitrates, however, metal cluster growth is unstable. Therefore, Ni dissolution from the nanosheets is suppressed, while the hydrolysis and decomposition of metal nitrates result in the deposition of the branched features.

As discussed in the Example, below, it has been discovered that selection of the anion of the metal salt may be used to control the type of structural modification. Specifically, the type of structural modification is controlled by the anion stability for metal cluster formation in the selected polar, aprotic solvent as illustrated in FIG. 3. For example, metal chlorides form stable clusters in acetone, facilitating dissolution of the precursor nanosheets to result in a porous nanosheet. By contrast, metal nitrates form unstable clusters in acetone, suppressing dissolution while facilitating hydrolysis and decomposition of the metal nitrates. This results in deposition of the nanoparticles to provide the branched nanosheets. Other anions that behave similarly to chlorides (form stable clusters) in the selected polar, aprotic solvent and other anions that behave similar to nitrates (form unstable clusters) in the selected polar, aprotic solvent may be used. Other polar, aprotic solvents may be used. Illustrative polar, aprotic solvents include acetone, dimethyl sulfoxide (DMSO), dimethylformamide (DMF), and acetonitrile. In embodiments, some alcohols, R—OH, wherein R is a relatively large organic compound may be used, provided the organic compound renders the alcohol aprotic in the present methods, by which it is meant the acidity of the alcohol is too low for the alcohol to act as a hydrogen bond donor. In other embodiments, e.g., when acetone is used, the polar, aprotic solvent is free of any hydroxyl groups and amine groups.

It has also been found that the amount of pores, domains, and nanoparticles (branches) which form depends upon the metal salt concentration, reaction temperature, and reaction time. In general, higher salt concentration, higher temperature, and longer reaction time all result in the formation of larger amount of pores, domains, and branches.

The method of making the present electrocatalytic material may comprise exposure to one or more additional modifier solutions comprising one or more additional metal salts in order to incorporate additional metal oxides as domains or deposit additional metal oxides as nanoparticles. In this way, structurally modified nanosheets composed of many different metal oxides, e.g., FeMnNi—O, may be formed. Generally, exposure to the one or more additional modifier solutions occurs sequentially (rather than simultaneously). Generally, the calcination step is carried out after the last exposure to a modifier solution.

The Example below describes a method of forming the precursor nanosheets on the surface of the substrate. The morphology and dimensions of the precursor nanosheets generally follows that described above, with the exception of the multimetal and the pore/domain/nanoparticle features.

The present electrocatalytic materials may be used on their own, combined with other additives (e.g., binders such ionomers, fillers such as conductive carbon), and/or disposed on another substrate to provide an electrode for use in an electrocatalytic system for catalyzing an electrochemical reaction. In embodiments, the electrochemical reaction is the OER, in which water is oxidized to produce free electrons, free hydrogen ions and oxygen ($O_2$) and the composite electrocatalytic material may catalyze the oxidation of water.

Figure 5:
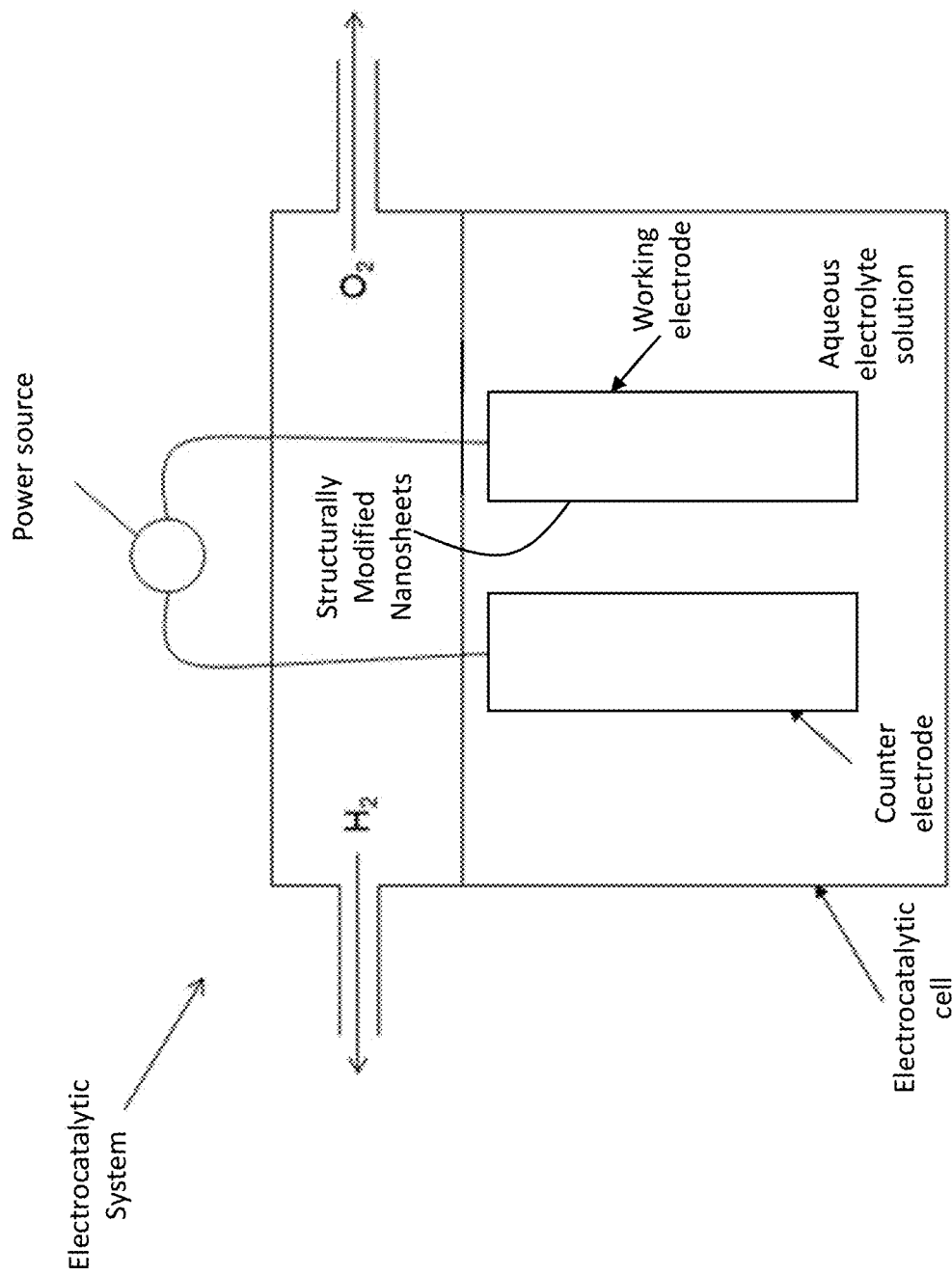
FIG. 5 shows a schematic of an electrocatalytic system comprising an electrode which comprises the present electrocatalytic materials.

Electrocatalytic systems including the present electrocatalytic materials (or electrodes formed thereof) are also provided. (See FIG. 5.) The electrocatalytic system may comprise an electrochemical cell configured to contain a fluid including an electrochemical reactant (e.g., a species to be oxidized to form an oxidation product, a species to be reduced to form a reduction product, or both); an electrode comprising any of the disclosed electrocatalytic materials in contact with the fluid; and a counter electrode. The selection of fluid depends upon the particular electrochemical reaction to be catalyzed. For the OER, the fluid may be an electrolyte solution (e.g., a solution of water and a water-soluble electrolyte). Various materials for the counter electrode may be used. The electrodes may be immersed in the fluid and may be in electrical communication with one another. The electrocatalytic system may further include a power source in electrical communication with the working and counter electrodes, the power source configured to apply an electrical potential across the electrodes. Other components may be included, e.g., a membrane separating the electrodes, a collection cell configured to collect the oxidation/reduction product(s) from the electrochemical cell, etc.

Methods of using the present electrocatalytic materials (or electrodes or electrocatalytic systems comprising the materials) to catalyze an electrochemical reaction are also provided. In embodiments, the method includes exposing any of the disclosed electrocatalytic materials to a fluid including an electrochemical reactant. The exposure results in the oxidation of the electrochemical reactant (e.g., $H_2O$) at the electrocatalytic material-fluid interface to produce an oxidation product (e.g., 02), which may be separated from the fluid and collected. An electrical potential may be applied across the electrode and the counter electrode to induce the oxidation reaction.

The present electrocatalytic materials may be characterized by their efficiency at catalyzing a particular electrochemical reaction, e.g., the OER. The efficiency may be provided as the Tafel slope as determined using the procedures described in the Example, below. In embodiments, the Tafel slope for the OER is no greater than 35 mV·dec$^{-1}$, no greater than 30 mV·dec$^{-1}$, or no greater than 25 mV·dec$^{-1}$. These values may be referenced with respect to the electrolyte solution being used, e.g., 0.1 M KOH, as well as the conditions used for determining the Tafel slope. (See the Example, below.)

The term "average," when used in reference to dimensions of the components of the electrocatalytic materials, refers to an average value as determined from a representative population. Such average dimensions may be determined from SEM or TEM images, including cross-sectional images.

Example

Introduction

Several transition-metal oxides and hydroxides based on earth-abundant elements, such as Fe, Ni, and Co, have emerged as a new generation of oxygen evolution reaction (OER) catalysts due to their low cost, decent activity, and multifunctionality. However, the relatively complicated surface structuring methods, high Tafel slope, and low stability hinder their practical application in replacement of the conventional Ir- and Ru-based catalysts. Herein, hierarchically structured mixed oxides were designed on conductive substrates (e.g., ITO and Ni foam) via deposition of nanosheets (NSs) and a subsequent bidirectional nanomodification approach was designed with metal salts in aprotic polar solvent (e.g., acetone) as the primary modifying reactants. This strategy was used to prepare NiO-based NSs that had nanopores (pNSs), nanobranches (bNSs), or a combination both, and that contained up to four transition metal elements. A record-low Tafel slope (22.3 mV·dec$^{-1}$) and week-long continuous operation durability were achieved by FeMnNi—O NSs supported on Ni foams. The hierarchical mixed oxide electrodes described below provide a cost-effective route to generating high, reliable, and stable OER catalytic activities, paving the way for both electrocatalyst design and practical water-splitting devices.

Experimental

Synthesis of NiO nanosheets (NiO NSs): NiO NSs were synthesized via wet chemical precipitation. Specifically, a piece of indium tin oxide-coated glass (ITO, 0.8 cm×1.0 cm) or Ni foam as a model conductive substrate was ultrasonically cleaned in ethanol and deionized water several times and then dried at 60° C. for 1 h. Meanwhile, 4.2 mmol of Ni(CH$_3$COO)$_2$ and 0.45 mmol of (NH$_4$)$_2$S$_2$O$_8$ were dissolved in 10 mL of deionized water and were fully stirred for ~10 min. Successively, a saturated ammonia aqueous solution at different volume ratios was added into the mixture solution, which was then stirred for 2 min to result in a pale blue solution. The cleaned ITO or Ni foam was submerged into the solution for 60 min, allowed to dry in air at room temperature, and then transferred into an oven set at 50° C. for 1 h. The product was washed with deionized water several times and then dried at room temperature with nitrogen, to provide the Ni-precursor NSs. Finally, the Ni-precursor NSs were heated in air at 500° C. at a rate of 5° C.·min$^{-1}$ and then kept for 2 h to obtain the NiO NSs.

Synthesis of porous MNi—O nanosheets (MNi—O pNSs): In a typical synthesis, 1.0 mmol metal chloride hydrates (e.g., FeCl$_3$·6H$_2$O or CoCl$_2$·6H$_2$O) were ultrasonically dispersed in 10 mL acetone for 10 min as the modifier solution. Then, Ni-precursor NSs were immersed in the modifier solution for 5 min at different reaction temperatures (35, 45, and 55° C.). These samples were then thoroughly rinsed with acetone and were allowed to dry at room temperature. The resulting samples were then sintered at 500° C. for 2 h.

Synthesis of branched MNi—O nanosheets (MNi—O bNSs): The MNi—O bNSs were synthesized using the same method as that for MNi—O pNSs except metal nitrate hydrates [e.g., Mn(NO$_3$)$_2$·4H$_2$O, Co(NO$_3$)$_2$·6H$_2$O, or Ni(NO$_3$)$_2$·6H$_2$O] were used instead of the metal chloride hydrates.

Synthesis of multi-metal oxide nanosheets [(M$_1$M$_2$ ... )Ni—O NSs]. Multi-metal oxide NSs were synthesized by subsequently soaking the Ni-precursor NS samples in different modifier solutions in the order M$_1$, M$_2$, etc. For the multi-metal oxide NS samples reported in this Example, FeCl$_3$ was used for Fe, Co(NO$_3$)$_2$ was used for Co, and Mn(NO$_3$)$_2$ was used for Mn. After reacting with all modifier solutions, these samples were then sintered at 500° C. for 2 h.

Materials characterization: Ensemble crystal structure was studied by X-ray diffraction (XRD, Bruker D8 Advance) using a Cu Kα radiation source operated at 40 kV and 40 mA with a step size of 2° and 2theta (2θ) ranging from 20 to 70°. The morphology and microstructures of the samples were studied using a Hitachi SU8030 scanning electron microscope (SEM) and JEOL JEM-ARM300F transmission electron microscope (TEM), both equipped with energy dispersive X-ray spectroscopy (EDS) detectors. The specific surface areas were measured using the Brunauer-Emmett-Teller (BET) method, and the pore size distributions were calculated by the desorption branch of the isotherms. The isotherm curves exhibited a large portion of N$_2$ uptake below 0.4 (P/P$_0$) and a higher N$_2$ uptake above 1.0 (P/P$_0$), which were caused by a large number of macroporous adsorption and capillary condensation. The chemical states of the elements on the surface of pNSs and bNSs were measured by X-ray photoelectron spectroscopy (XPS, Thermo Scientific ESCALAB 250Xi). Cluster formation in the modifier solutions was analyzed by liquid chromatography-mass spectrometry (LC-MS, Bruker AmaZon-X connected to an Agilent 1200 Series). The elemental concentrations of Ni and Co in the modifier solutions were measured by inductively coupled plasma atomic emission spectroscopy (ICP-AES, Thermo Elemental IRIS 1000).

Electrochemical measurements: The catalytic activity of pNSs and bNSs for oxygen evolution reaction (OER) was measured in a standard three-electrode setup connected to a potentiostat (Gamry Reference 600 plus). A Pt mesh (2×2 cm) was used as the counter electrode, a 1 M Hg/HgO electrode as the reference electrode, and the samples were supported on ITO or Ni foam as the working electrode. The supporting electrolyte was 0.1 M and 1.0 M aqueous KOH solution, and the potential was converted to that versus the reversible hydrogen electrode (RHE) according to the following equation:

$$E(V \text{ vs. RHE})=E(V \text{ vs. Hg/HgO})+0.098+0.0592 \times pH. \quad (1)$$

Cyclic voltammograms (CVs) were first performed at a scan rate of 100 mV·s$^{-1}$ for 10 times to activate the working electrodes. Then, linear sweep voltammetry (LSV) was performed at a scan rate of 10 mV·s$^{-1}$. The electrochemical impedance spectroscopy (EIS) was carried out in a frequency range from 0.1 Hz to 1.0 MHz for determining the uncompensated resistance (R$_u$). Chronoamperometry (E–t) testing was performed by holding a constant potential on the working electrode for examining its long-term stability. All potential values were IR-corrected by subtracting the uncompensated ohmic resistance loss, R$_u$ from the recorded voltage in the form of E–iR. The R$_u$ values of all samples reported in this Example are listed in the Table, below.

TABLE $R_u$ values in iR correction of all samples reported in this Example determined by electrochemical impedance spectroscopy (EIS) in 0.1M KOH solution

| Sample | $R_u$ (Ω) |
|---|---|
| ITO coated glass | 93.1 |
| Ni foam | 7.5 |
| NiO NS on ITO coated glass | 11.4 |
| FeNi—O pNS on ITO coated glass | 10.8 |
| MnNi—O bNS on ITO coated glass | 8.3 |
| CoNi—O pNS on ITO coated glass | 8.1 |
| CoNi—O bNS on ITO coated glass | 8.6 |
| FeCoNi—O NS on ITO coated glass | 8.7 |
| FeMnNi—O NS on ITO coated glass | 8.0 |
| MnCoNi—O NS on ITO coated glass | 8.2 |
| FeMnCoNi—O NS on ITO coated glass | 8.0 |
| NiO NS on Ni foam | 7.0 |
| FeCoNi—O NS on Ni foam | 7.5 |
| FeMnNi—O NS on Ni foam | 8.5 |

Results and Discussion

Herein, a method to synthesize hierarchically structured mixed oxide OER electrodes through nanosheet growth, bidirectional nanomodification achieved by reaction with an acetone solution of metal salts, and subsequent calcination are reported (FIG. 1A). Using ITO-coated glass slides as a model conductive substrate, Ni-precursor NSs [mixture of NiO and their (oxy)hydroxide forms] were first deposited onto the substrate via wet chemical precipitation from an aqueous solution of $Ni(OAc)_2$, $(NH_4)_2S_2O_8$, and $NH_4OH$. Upon subsequent calcination in air at 500° C., these precursor NSs synthesized at the optimized reaction temperature and ammonia concentration were converted into uniform arrays of NiO NSs covering the entire substrate. The calcination step is important since the electronic conductivity of the precursor NSs is too low for electrocatalytic activity. To generate secondary nanostructures on the NSs and to modify them into hierarchical nanostructures, cobalt salt solutions in acetone were used to react with the precursor NS arrays before calcination. The use of acetone, an aprotic polar solvent, instead of water is important because the transition metal salts involved in this process form acidic solutions in water, which will rapidly dissolve and damage the NSs instead of controllably modifying their structures. When converted to stable oxides upon calcination, the samples modified by $CoCl_2$ became porous NSs (pNSs), while $Co(NO_3)_2$ resulted in branched NSs (bNSs), as confirmed by scanning electron microscope (SEM) images (FIG. 1A, right column). The degree of modification (formation of nanostructures and metal incorporation) depends on the reaction temperature and reaction time. The formation of a porous or branched structure indicates that either an etching or overgrowth process occurred during the modification.

Figure 1B:
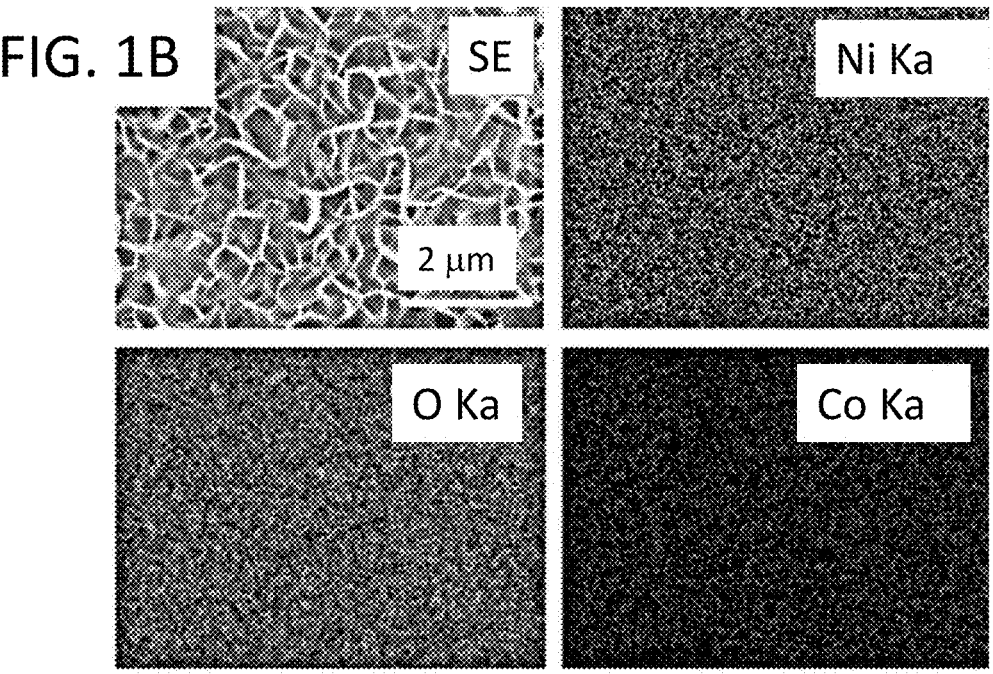
Figure 1C:
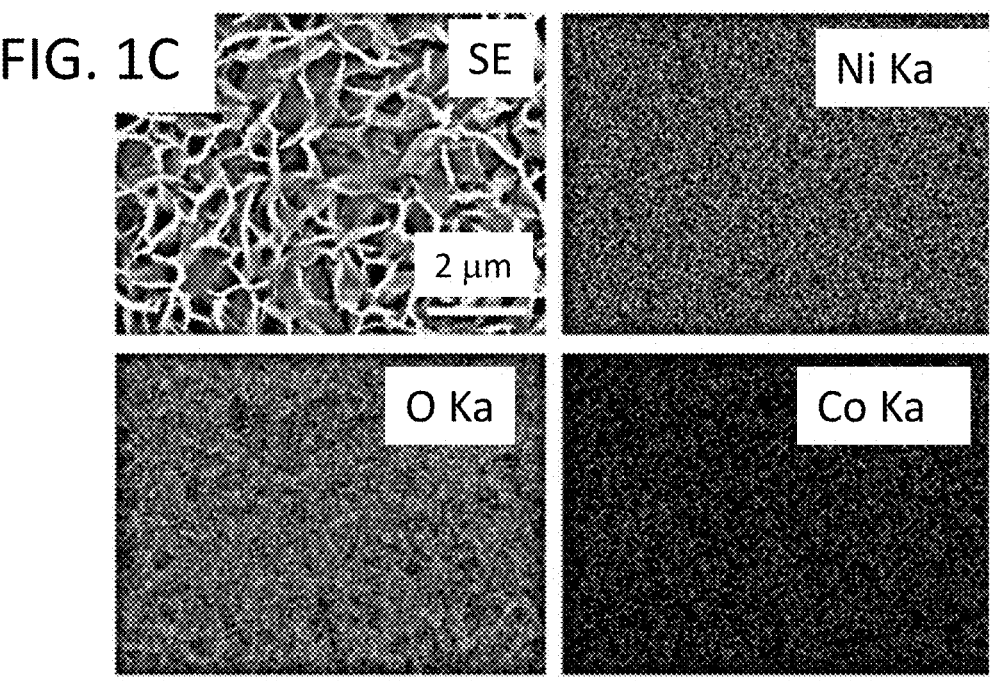
Figure 1D:
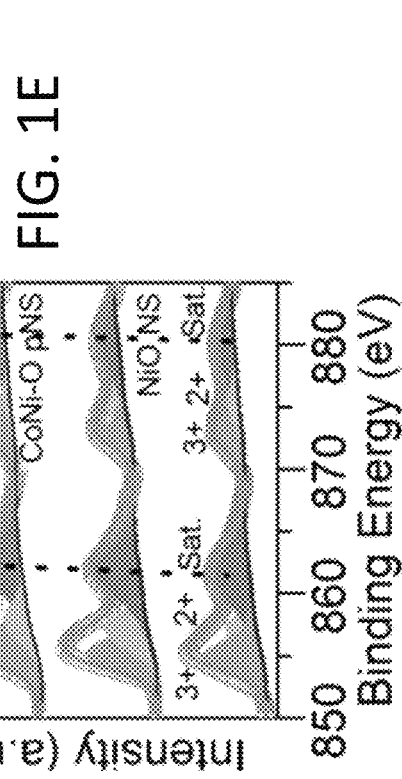
Figure 1E:
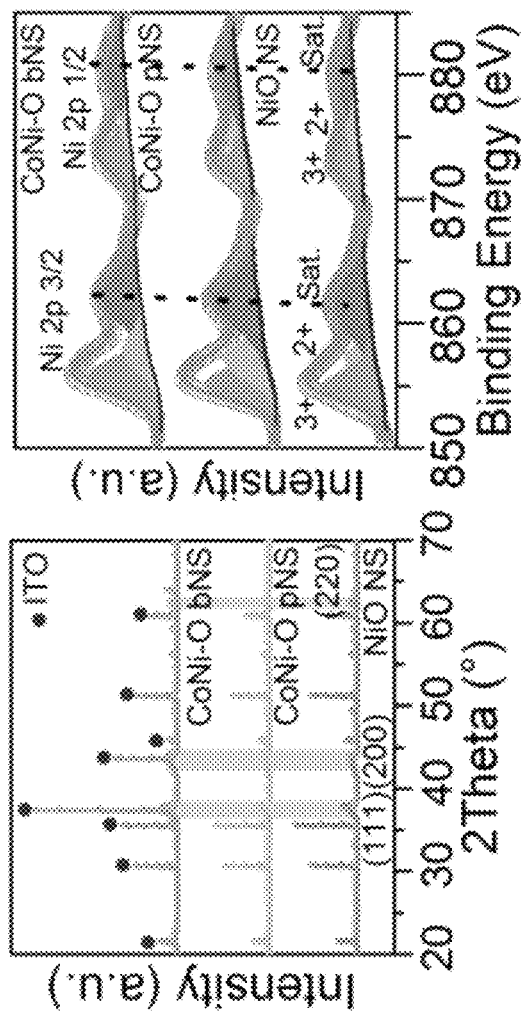
Figure 1F:
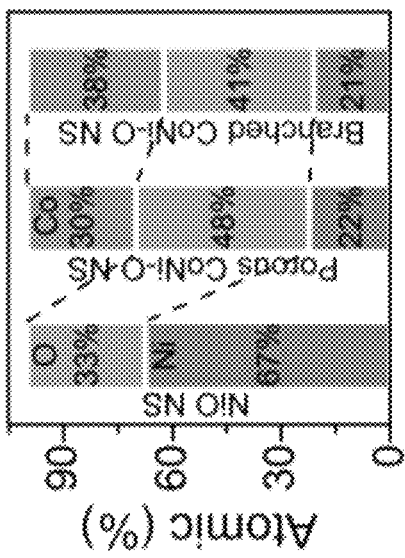
Figure 1G:
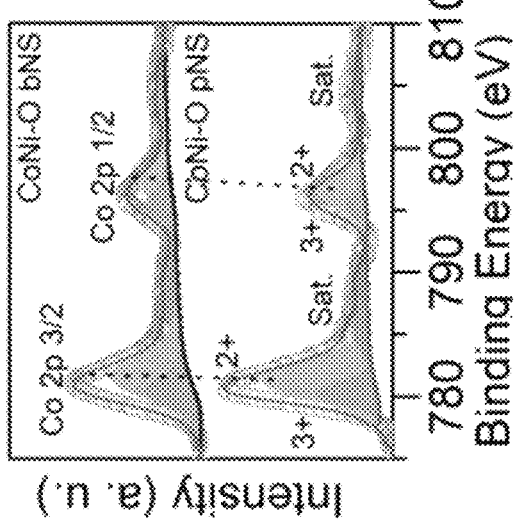
Figure 1I:
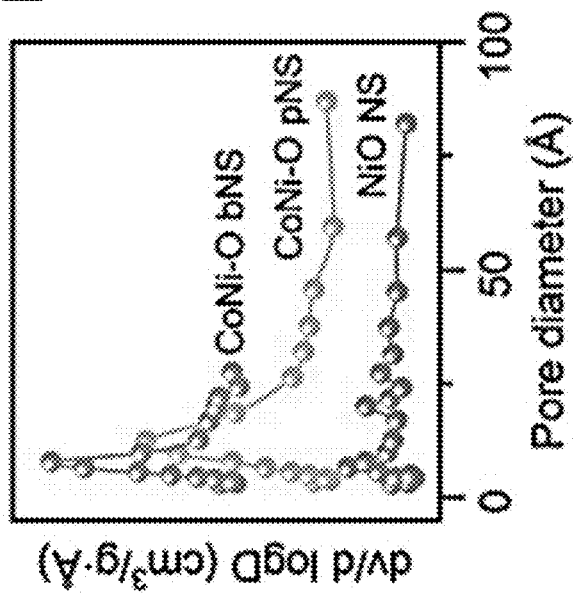
Figure 1H:
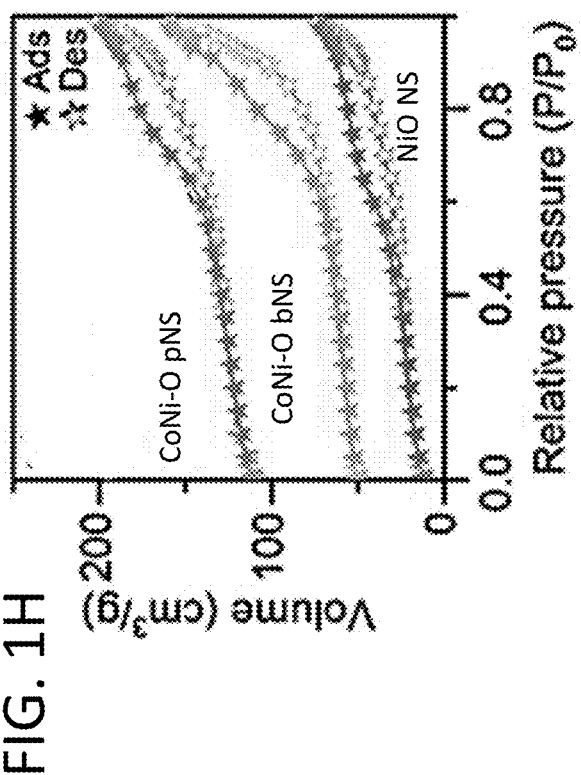
Figure 1J:
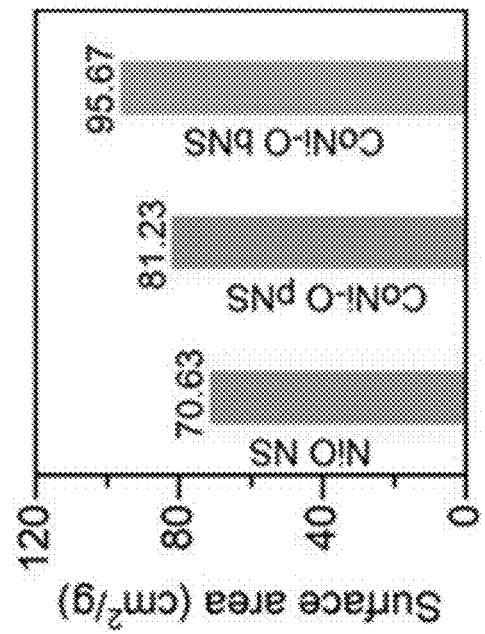

In both cases, energy-dispersive X-ray spectroscopy (EDS) elemental mapping reveals that Co was incorporated into the NS arrays uniformly on the microscale (FIGS. 1B and 1C). These Co- and Ni-containing hierarchically structured oxide NSs are referred to as CoNi—O bNSs and pNSs hereinafter. Ensemble-scale X-ray diffraction (XRD) and X-ray photoelectron spectroscopy (XPS) suggest that the dominating crystal structure is the rock salt NiO phase (FIG. 1D), in which Ni and Co exist (FIGS. 1E-1G). The nitrogen adsorption-desorption isotherm shows appreciable hysteresis loops for NiO NSs, CoNi—O pNSs, and CoNi—O bNSs (FIG. 1H), indicating the presence of abundant mesopores in all structures on the scale of $10^1$ nm (FIG. 1I). Both hierarchical NS samples show an improved mass-specific surface area compared to the unmodified NiO NSs (FIG. 1J). Taken together, the nanomodification process introduces abundant mesopores on the NS structures, which are essential in promoting mass transport and increasing the number of accessible active sites in an electrochemical reaction.

Transmission electron microscopy (TEM) was used to reveal the phase compositions and their distribution in the modified samples. As a starting point for comparison, electron diffraction over an ensemble of unmodified NiO NSs was radially integrated and compared to simulated diffraction patterns. In this case, the experimental diffraction pattern matches well with the rock salt NiO structure (space group Fm$\bar{3}$m). Low-magnitude TEM imaging confirms the porous structure of the CoNi—O pNS sample which was modified by the $CoCl_2$ acetone solution (FIG. 2A). Two phases were identified from electron diffraction: a dominant rock salt (Fm$\bar{3}$m) phase corresponding to NiO and a minor spinel (Fd$\bar{3}$m) phase corresponding to $Co_3O_4$. The characteristic (111) and (022) lattice spacings were further used to identify the spatial distribution of $Co_3O_4$ in high-resolution TEM (HRTEM) images. By filtering only these reflections in the Fourier transform of the HRTEM image, the locations of $Co_3O_4$ domains out of the dominant NiO structures were identified as highlighted in FIG. 2B. Consistent with the etching process, both types of oxides were present in the form of interconnected nanoparticles and formed a network-like, porous structure. In comparison, $Co(NO_3)_2$-derived bNSs still retained a continuous NS structure without pore formation, while additional strip-like domains were overgrown on top (FIG. 2C). Similar to the pNSs, cobalt species also existed in the form of $Co_3O_4$, which constituted the branches on continuous NiO layers (FIG. 2D). Consistently, scanning TEM (STEM) EDS elemental mapping results also reveal a slight nanoscale inhomogeneity in the distribution of Co in both cases.

The bidirectional nanomodification towards porous or branched mixed oxide structures applies to many transition metals other than Co, and the directionality is controlled by the type of anions [$Cl^-$ or $(NO_3)^-$] used in the metal salt in the acetone-based modifier solution. Indeed, homometallic oxide overgrowth occurred when $Ni(NO_3)_2$ in acetone was used, leading to the formation of bNSs as shown by SEM and TEM. HRTEM reveals that each NS was polycrystalline after the modification, which is in contrast to the quasi-monocrystalline structure in the unmodified NSs. Hierarchical NSs modified by other transition metals such as Fe and Mn were also synthesized following the same design rules; for example, $FeCl_3$ in acetone led to FeNi—O pNSs (FIG. 2E), and $Mn(NO_3)_2$ in acetone led to MnNi—O bNSs (FIG. 2F). In both instances, ensemble-scale XRD and XPS show that the dominating crystal structure was still NiO, and multiple chemical states could be found for Fe and Mn. EDS elemental mapping shows that Fe and Mn were incorporated into the NS arrays uniformly on the microscale. In particular, the branches on MnNi—O bNSs consisted of overgrown nanoparticles (FIG. 2G). Electron diffraction reveals two phases: a dominant rock salt NiO (Fm$\bar{3}$m) phase and a minor bixbyite $Mn_2O_3$ (Ia$\bar{3}$) phase. The experimentally determined $Mn_2O_3$ lattice was distorted from the simulated pattern, presumably due to the high defect density in this structure. The $Mn_2O_3$ phases were present in the form of nanoparticles around 15-20 nm in size, as identified by their characteristic (002), (112), (143), and (004) lattices in the HRTEM image (FIG. 2H) and STEM EDS elemental mapping. In comparison, $FeCl_3$-derived pNSs are polycrystalline and only showed rock salt NiO lattices in the TEM images, most likely due to the low Fe content doped in NiO or possible amorphous phase formation. It is worth noting that a few types of metal salts, such as $NiCl_2$, $Fe(NO_3)_3$, and their hydrates, have low solubility in acetone, which leads to impractically slow modification kinetics. Nevertheless, all soluble metal chlorides and nitrates tested in this Example resulted in pNS and bNS structures, respectively.

To understand the mechanistic pathways towards the bidirectional modification by metal salts in acetone, liquid chromatography-mass spectrometry (LC-MS) was performed on acetone solutions of cobalt salts (chloride and nitrate). The characteristic chlorine isotope distribution was used to identify the number of chlorine atoms in cluster species. Indeed, all dominant species in the $CoCl_2$ acetone solution can be decomposed to a [CoCl] core bounded to 2 or 4 acetone molecules and an arbitrary number of $[CoCl_2]$ building blocks attached to it. The amount of Co clusters in acetone showed a very well-defined decay as a function of size, which suggests high cluster stability and low driving force for them to precipitate. By contrast, $Co(NO_3)_2$ in acetone does not form stable clusters, as the distribution of metal clusters showed an irregular pattern. Inductively coupled plasma mass spectrometry (ICP-MS) results further reveal that after reacting with the Ni-precursor NSs, the $CoCl_2$ acetone solution showed an order of magnitude higher Ni concentration than the $Co(NO_3)_2$ solution, suggesting that chlorine facilitates the dissolution of Ni from the NSs into the solution.

Based on these results, it was concluded that the directionality of the nanomodification process is controlled by the anion stability for metal cluster formation in acetone, as summarized in FIG. 3. Metal (e.g., Co and Ni) chlorides form stable clusters in acetone, which facilitate Ni dissolution from the NSs into the solution while hindering precipitation, resulting in porous structures. Metal nitrates, on the contrary, form unstable metal clusters. Therefore, Ni dissolution from the NSs is suppressed, while the hydrolysis and decomposition of metal nitrates result in the deposition of the overgrown features.

Figure 4B:
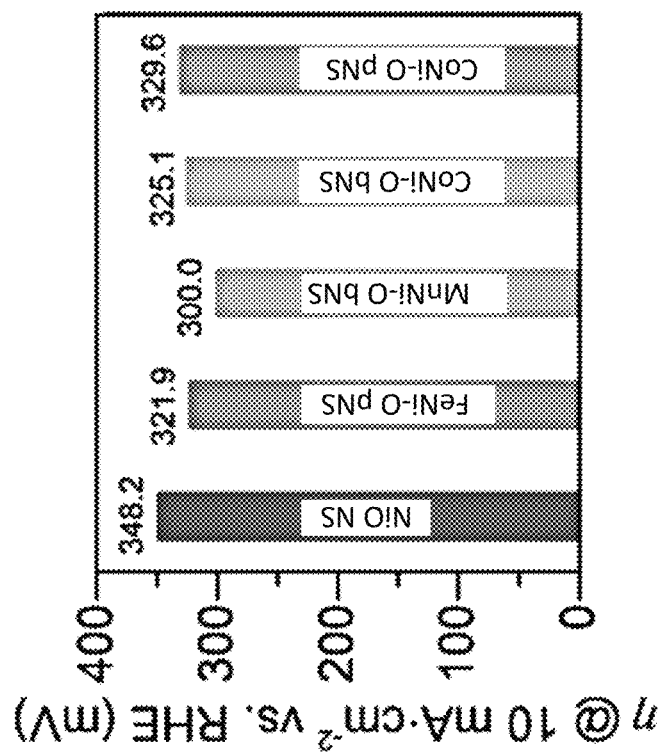
Figure 4A:
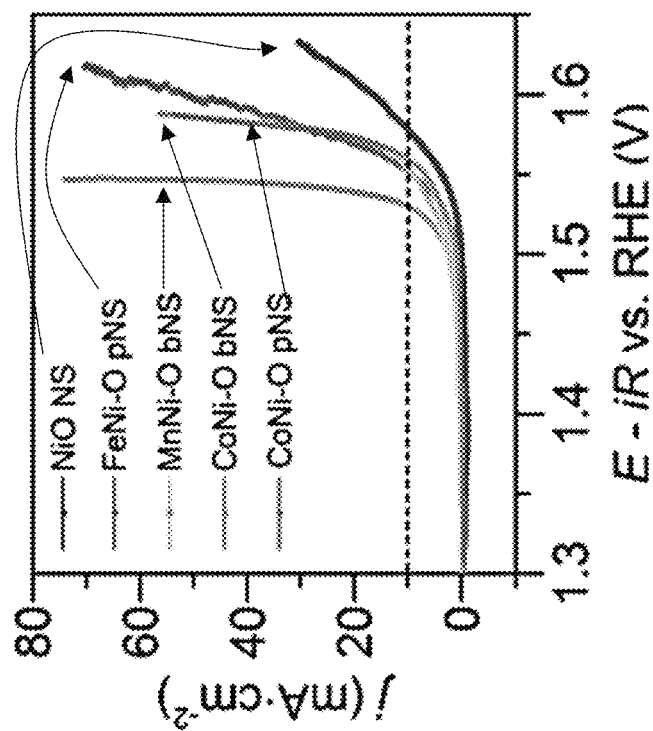
Figure 4C:
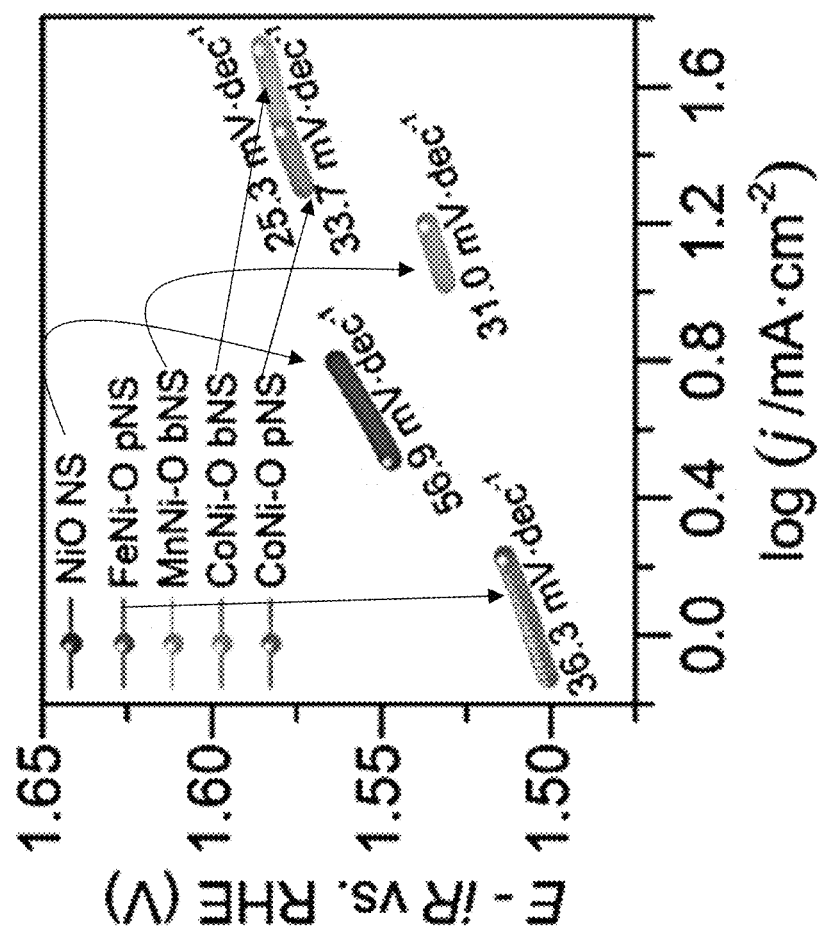
Figure 4E:
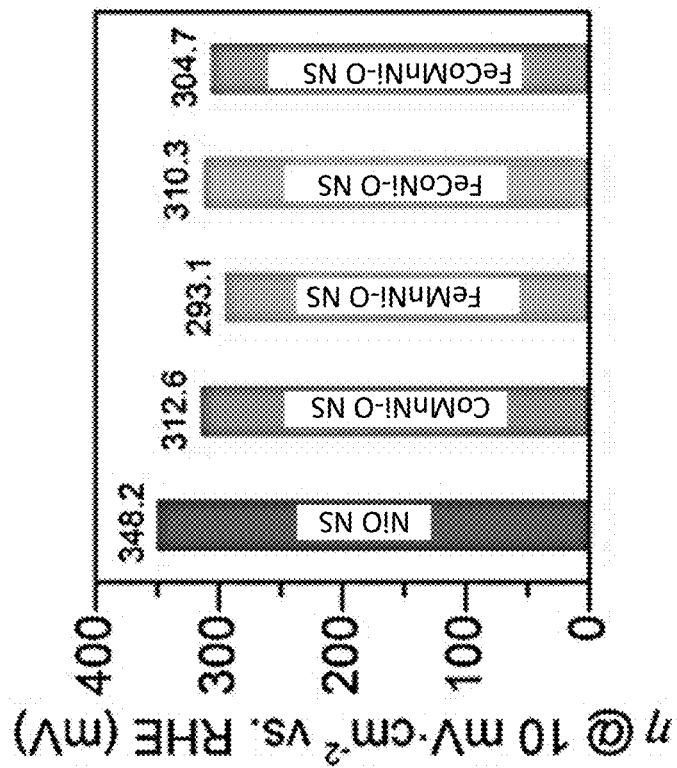
Figure 4D:
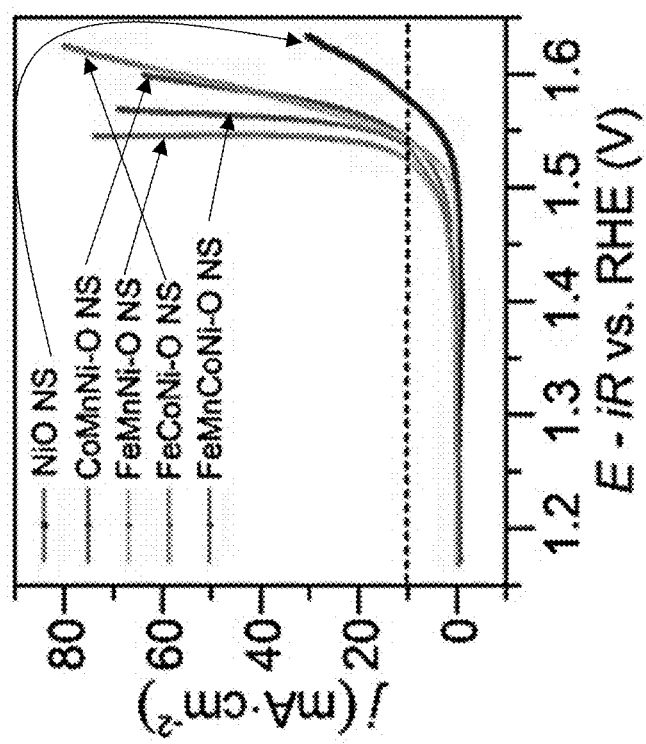
Figure 4F:
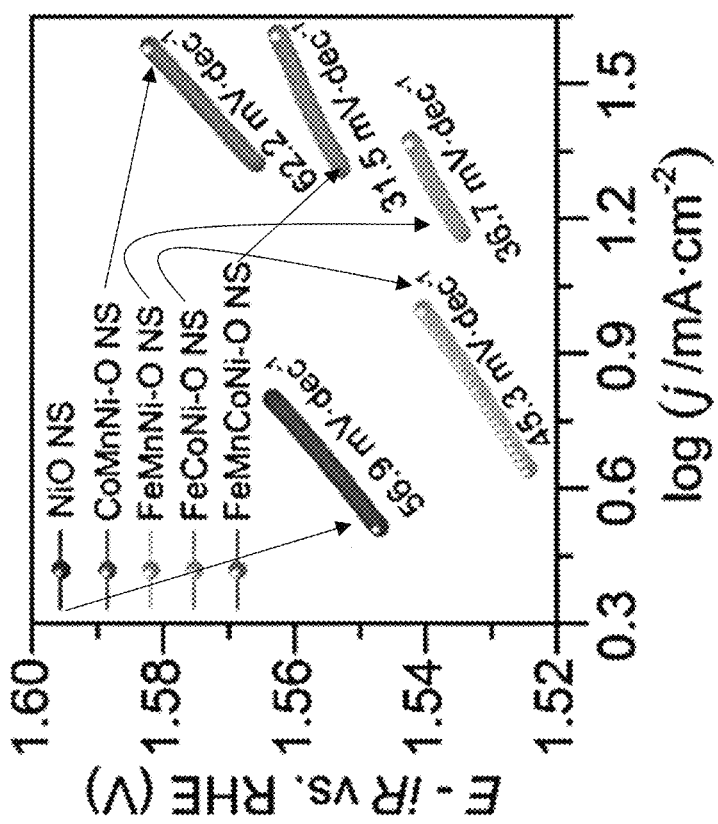

The electrocatalytic OER activities of NiO NSs and modified hierarchical structures (pNSs and bNSs) were evaluated in 0.1 M KOH using a standard three-electrode setup consisting of a Hg/HgO reference electrode and a Pt mesh counter electrode. Under relatively slow-scan linear sweep voltammetry (LSV) conditions (10 $mV·s^{-1}$), all results were IR-corrected using experimentally determined uncompensated resistance ($R_u$). (See the Table, above.) All hierarchical structures reported in this Example (FIG. 4A) showed improved OER performance as compared to the unmodified NiO NS sample. Specifically, monometallic NiNi—O bNSs showed a ~19 mV decrease in overpotential (at j=10 $mA·cm^{-2}$) than unmodified NiO NSs, and the MnNi—O NSs achieved the lowest overpotential (at j=10 $mA·cm^{-2}$) of 300.0 mV (FIG. 4B). This result suggests that both geometric nanostructuring and elemental modification contributed to the enhancement in OER activity. Meanwhile, the Tafel slope was reduced by at least 20 $mV·dec^{-1}$ in all hetero-metallic samples (FIG. 4C). Multimetallic hierarchical structures were further synthesized by sequentially modifying the Ni-precursor NSs in multiple metal salt modifier solutions, which reduced the overpotential to 293.1 mV at j=10 $mA·cm^{-2}$ with a low Tafel slope exhibited by FeMnNi—O (FIGS. 4D-4F).

Figure 4I:
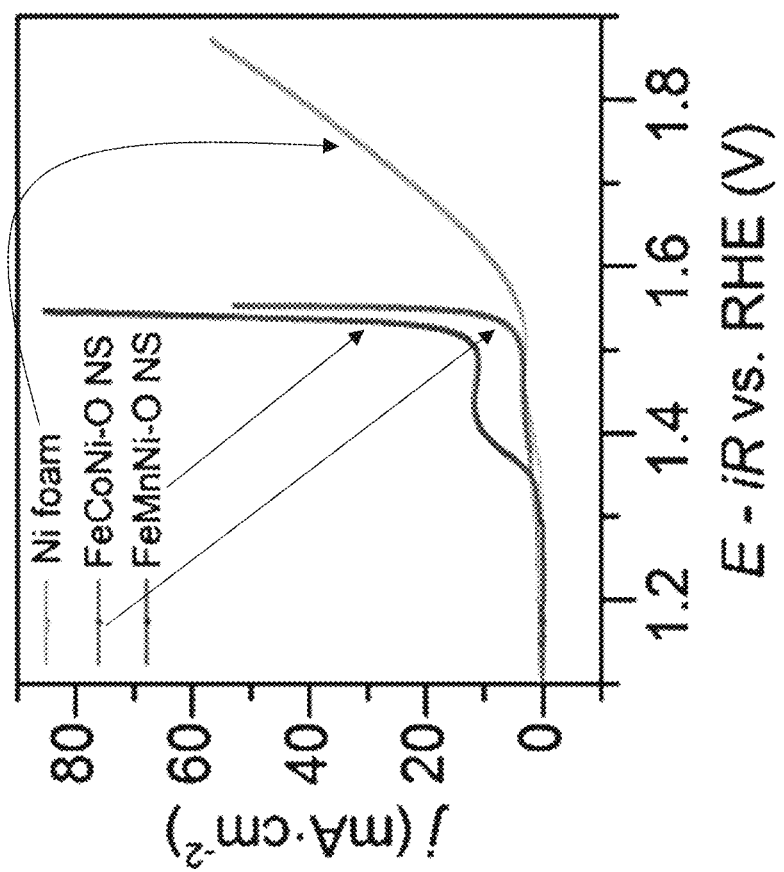
Figure 4K:
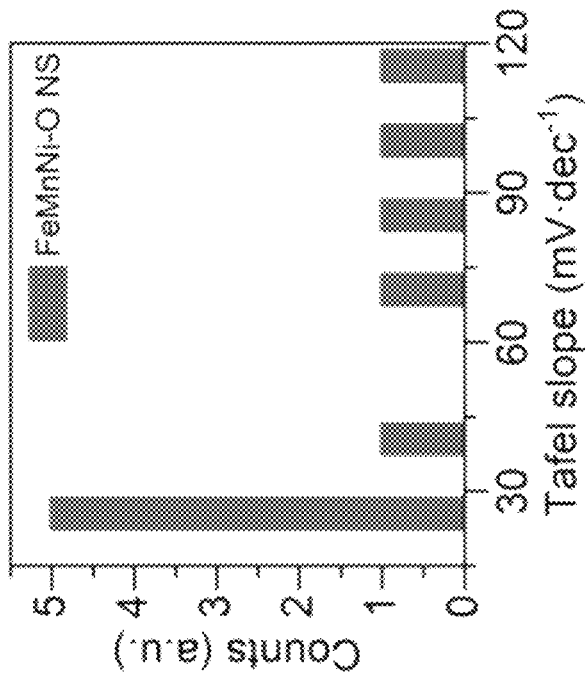
Figure 4J:
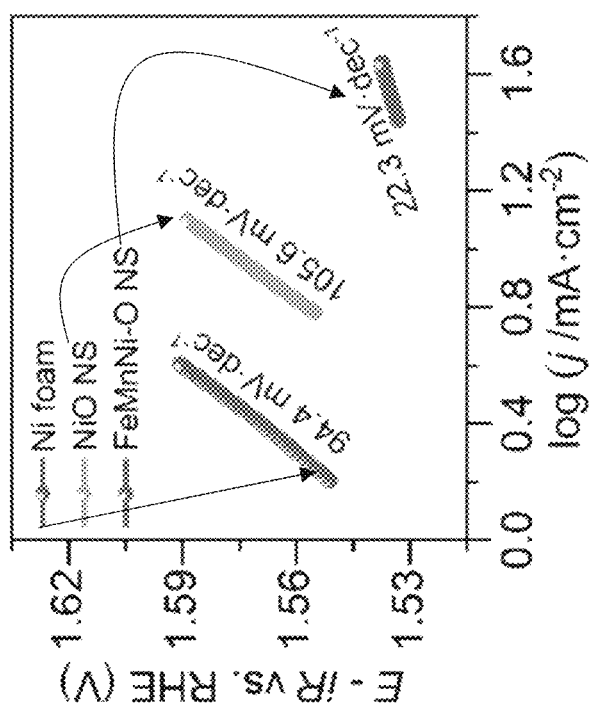

To further optimize the performance of hierarchically modified OER catalysts using the aforementioned methods, Ni foam was used as a substrate by taking advantage of its high electrical conductivity and sub-millimeter-scale porosity (FIG. 4G). Through NS growth, sequential modification in acetone solutions, and calcination, two more levels of hierarchical structures were created on the Ni foam: the NSs on the microscale and multimetallic branches/pore on the nanoscale in the form of FeMnNi—O NSs (FIG. 4H). Structures containing up to four transition metal elements were synthesized and tested for OER. These multi-level hierarchical structures show exceptional OER performance according to the LSV polarization curves (FIG. 4I). Indeed, record low Tafel slopes were achieved by this material (22.3 $mV·dec^{-1}$) in 0.1 M KOH electrolyte. The Faraday efficiency of FeMnNi—O NS was tested in 1.0 M KOH for sufficient bubble formation. During a galvanostatic electrolysis of 150 s, the amount of oxygen and hydrogen evolved yielded a Faraday efficiency of 60.32%. The samples with an ultra-low Tafel slope were reproducible in terms of their performance. Specifically, 10 independently synthesized batches were tested, and their OER performances were tested in 0.1 M KOH electrolyte. Indeed, half of the samples possessed a low Tafel slope <30 $mV·dec^{-1}$ (FIG. 4K) with performance suitable for replacing the commercial catalysts.

Figure 4L:
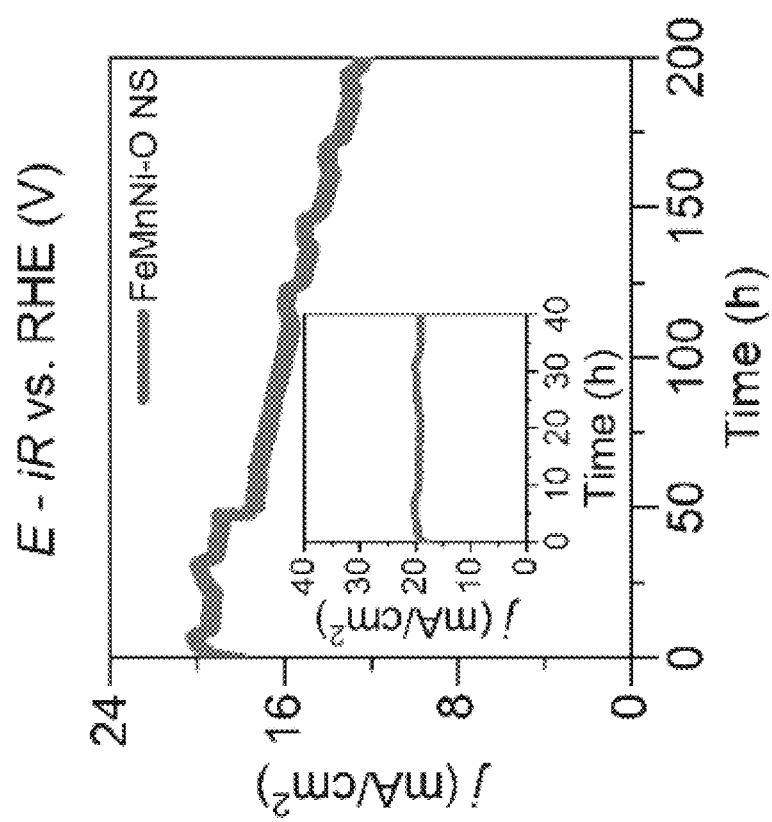

In addition to their high activity, the FeMnNi—O NS catalysts on Ni foam also showed exceptional durability during prolonged operation. Chronoamperometry was performed at 1.53 V so that the initial current density was close to 20 $mA·cm^{-2}$. Minimal performance degradation (~2%) was observed in the initial 40 h of continuous operation on FeMnNi—O NSs, and they still generated an output of >12 $mA·cm^{-2}$ at the end of a 200 h extended test (FIG. 4L). This result shows that the hierarchical catalysts in this Example are among the most stable non-precious metal OER catalysts available, despite operating in a relatively weak alkaline solution. Furthermore, it was noted that this long-term decrease in performance was complexed by the decrease in electrolyte pH and bubble formation. Indeed, the morphology of these samples did not change significantly, as examined after 100 h of operation (FIG. 4H). Taken together, these multimetallic, multi-level hierarchical NSs have low overpotential, low Tafel slope, high reproducibility, and high durability when served as practical OER electrodes for extended water splitting operation.

CONCLUSION

In summary, hierarchically structured mixed oxide materials were strategically designed and synthesized, consisting of up to four metal elements and three levels of hierarchical structures with dimensions from few-nm to sub-μm and then sub-mm. This was enabled by a bidirectional nanomodification method that was developed for NSs based on their reaction with an acetone solution of metal salts, where the directionality of the modification was controlled by anion stability for metal cluster formation. The material FeMnNi—O NSs supported on Ni foam showed exceptional OER performance with an ultra-low Tafel slope of 22.3 $mV·dec^{-1}$, high reproducibility, and excellent durability in water splitting operation. This design strategy for constructing hierarchical mixed oxide electrodes paves a new avenue towards practically robust, low-cost, and high-performance water-splitting devices. More generally, this Example highlights how tailored compositional and surface structural engineering improves the electrocatalytic properties of transition metal oxides and shines light on the fabrication strategies for next-generation (opto)electronic devices.

Additional information and experimental data may be found in U.S. Pat. Appln. No. 62/965,218, which is hereby incorporated by reference in its entirety.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of making an electrocatalytic material, the method comprising:
   (a) forming precursor nanosheets comprising a precursor metal on a surface of a substrate;
   (b) exposing the precursor nanosheets to a modifier solution comprising a polar, aprotic solvent and a metal salt at a temperature and for a period of time, the metal salt comprising a metal cation and an anion, thereby forming modified precursor nanosheets; and
   (c) calcining the modified precursor nanosheets for a period of time to form an electrocatalytic material comprising structurally modified nanosheets and the substrate, each nanosheet extending from the surface of the substrate and having a solid matrix, wherein the solid matrix defines pores distributed throughout the solid matrix and comprises a precursor metal oxide and domains of another metal oxide distributed throughout the precursor metal oxide; or wherein the solid matrix comprises the precursor metal oxide and nanoparticles of the another metal oxide distributed on a surface of the solid matrix.

2. The method of claim 1, wherein the polar, aprotic solvent is selected from the group consisting of acetone, dimethyl sulfoxide (DMSO), dimethylformamide (DMF), acetonitrile, and combinations thereof.

3. The method of claim 1, wherein the metal salt is a chloride.

4. The method of claim 1, wherein the metal salt is a nitrate.

5. The method of claim 1, further comprising, after step (b) and prior to step (c), exposing the precursor nanosheets to another modifier solution comprising the polar, aprotic solvent and another metal salt.

6. The method of claim 1, wherein the precursor metal oxide and the another metal oxide are different metal oxides.

7. The method of claim 1, wherein the solid matrix comprises three or more different metal oxides.

8. The method of claim 1, wherein the precursor metal oxide and the another metal oxide are independently selected from the group consisting of Fe oxides, Co oxides, Ni oxides, and Mn oxides.

9. The method of claim 1, wherein the precursor metal oxide is a Ni oxide and the another metal oxide is selected from the group consisting of Fe oxides, Co oxides, Mn oxides, and combinations thereof.

10. The method of claim 1, wherein the precursor metal oxide is a Ni oxide and the another metal oxide is a combination of Fe oxides and Mn oxides.

11. The method of claim 1, wherein the structurally modified nanosheets are porous nanosheets wherein the solid matrix defines pores distributed throughout the solid matrix and comprises the precursor metal oxide and domains of the another metal oxide distributed throughout the precursor metal oxide.

12. The method of claim 11, wherein the solid matrix has outer surfaces which are free of any nanostructures.

13. The method of claim 1, wherein the structurally modified nanosheets are branched nanosheets wherein the solid matrix comprises the precursor metal oxide and nanoparticles of another metal oxide distributed on the surface of the solid matrix.

14. The method of claim 13, wherein the branched nanosheets are not porous.

15. The method of claim 13, wherein the solid matrix has outer surfaces which are free of any nanostructures except for the nanoparticles.

16. The method of claim 15, wherein the branched nanosheets are not porous.

* * * * *